United States Patent [19]

Flux et al.

[11] Patent Number: 5,458,221
[45] Date of Patent: Oct. 17, 1995

[54] SHOCK ABSORBING DEVICE

[75] Inventors: Peter R. Flux; David J. Patterson, both of Calne, United Kingdom

[73] Assignee: Latchways Limited, United Kingdom

[21] Appl. No.: 211,256

[22] PCT Filed: Sep. 23, 1992

[86] PCT No.: PCT/GB92/01744

§ 371 Date: Mar. 24, 1994

§ 102(e) Date: Mar. 24, 1994

[87] PCT Pub. No.: WO93/06384

PCT Pub. Date: Apr. 1, 1993

[30] Foreign Application Priority Data

Sep. 24, 1991 [GB] United Kingdom .................... 9120299

[51] Int. Cl.[6] ........................................................ F16F 7/12
[52] U.S. Cl. ................................................. 188/374; 188/371
[58] Field of Search ....................................... 188/371–377

[56] References Cited

U.S. PATENT DOCUMENTS

| | | | |
|---|---|---|---|
| 3,721,320 | 3/1973 | Hirsch | 188/374 |
| 3,757,900 | 9/1973 | Gischlar | 188/374 |
| 3,820,634 | 6/1974 | Poe | 188/374 X |
| 3,913,707 | 10/1975 | Wastenson et al. | 188/374 |
| 4,995,486 | 2/1991 | Garneweidner | 188/374 |
| 5,074,391 | 12/1991 | Rosenzweig | 188/374 |
| 5,154,262 | 10/1992 | Berwanger | 188/374 X |

FOREIGN PATENT DOCUMENTS

| | | |
|---|---|---|
| 0346209 | 6/1989 | European Pat. Off. . |
| 7331019 | 3/1974 | France . |
| 3522449 | 1/1987 | Germany ........................ 188/374 |
| 0212826 | 7/1986 | United Kingdom . |

*Primary Examiner*—Robert J. Oberleitner
*Assistant Examiner*—Alfred Muratori
*Attorney, Agent, or Firm*—Brooks & Kushman

[57] ABSTRACT

A shock absorber comprises a tubular sleeve (46) and a load applying member (45) having a nut (47) normally in engagement with an end of the sleeve (46). Under loading the nut is drawn into the sleeve to cause permanent radial deformation of the sleeve wall thereby absorbing the loading.

10 Claims, 5 Drawing Sheets

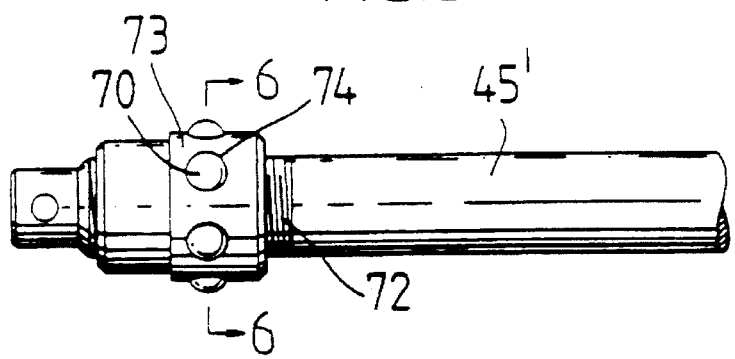
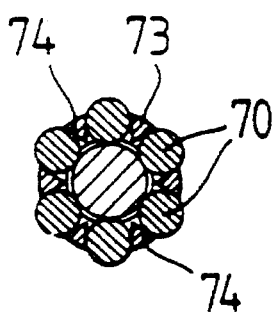
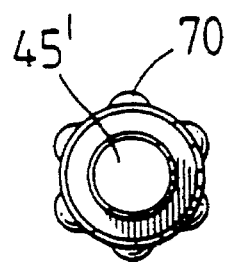
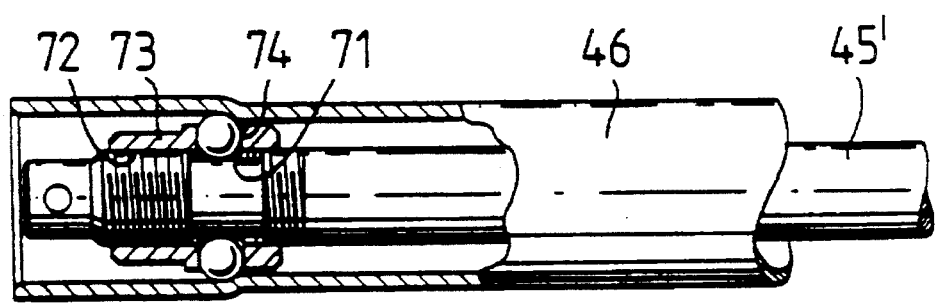
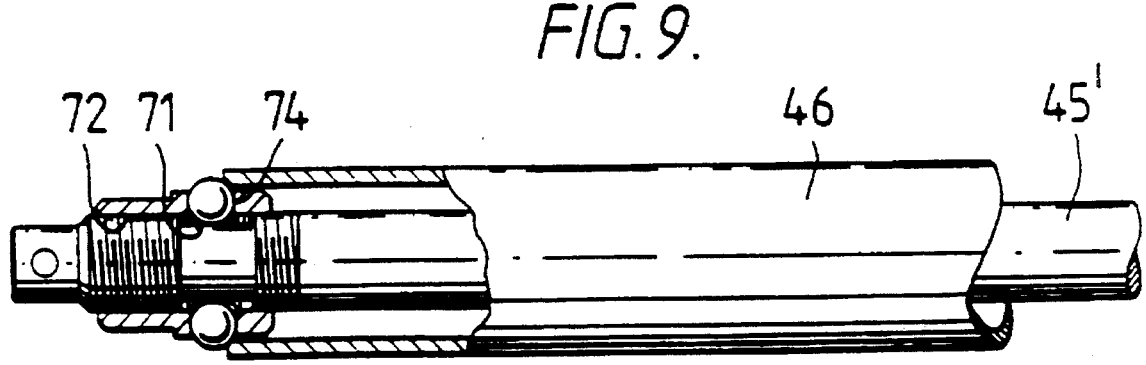

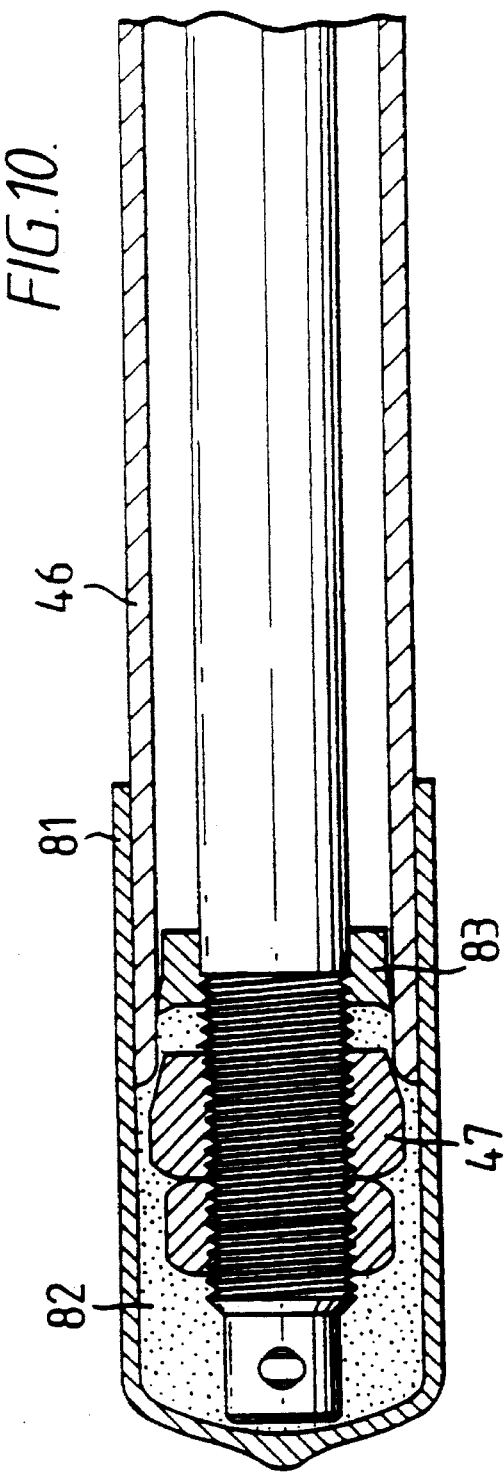
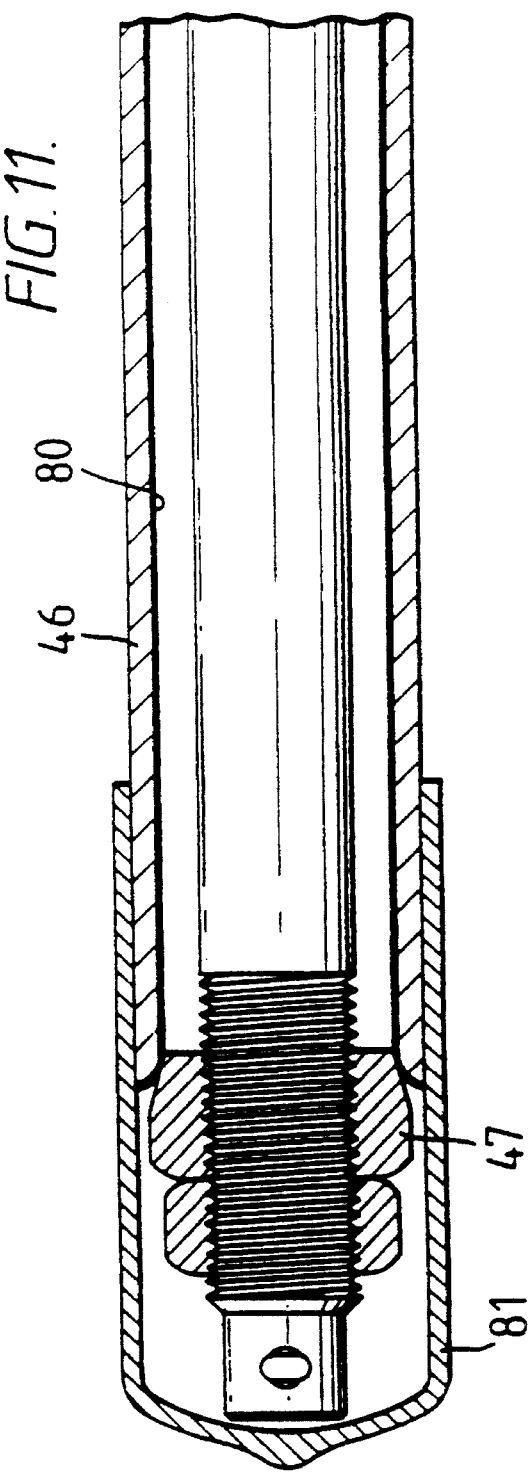

SHOCK ABSORBING DEVICE

FIELD OF THE INVENTION

This invention relates to a shock absorbing device particularly, but not exclusively, for use in load attachment systems in which a load attachment device is movable along an elongate support or location element, e.g. a wire or a rod-like member, secured with respect to a fixed support structure.

BACKGROUND TO THE INVENTION

GB-A-1,582,201 describes such a load attachment system. The elongate element, which may be rigid or flexible, is generally fixedly secured at its ends to the support structure as well as being located, at intermediate locations, with respect to the structure. The system includes a load-transfer or traversing device which is utilized to locate the elongate element at each intermediate location point, or is engaged with the elongate element to move therealong with the ability to traverse the intermediate support points without needing to be detached from the elongate element.

When a wire element is utilized for the elongate element, for example, it is usually provided with end ferrules or sleeves swaged thereon, provided with integral couplings for bolting to location fittings secured to a fixed structure. In many applications where a personnel safety line is concerned, a shock absorbing and line tensioning device, e.g. as described in EP-A-0,212,826, is interposed between the end ferrule of the wire and a location fitting to facilitate initial installation tensioning of the wire and to absorb shock loading applied to the wire in use.

The invention is therefore concerned with providing an improved shock absorbing device adapted to control the peak loading applied to the attachment means secured to the fixed structure.

The invention provides a shock absorber comprising two relatively movable parts for connection between an elongate support or location element and a fixed supporting support for the elongate element, one of said parts being provided with a tubular element and the other of said part being provided with a loading member extending through the tubular element and provided with outwardly projecting flange means which is adapted, under normal loading, to remain located against an end surface of the tubular element and, under greatly increased loading, to be pulled into the tubular element to cause a radially outward deformation of the wall of the tubular element thereby acting to absorb such loading.

Preferably at least one of the contacting surfaces on the flange means and the internal surface of the tubular element is provided by a lubricating material.

Such flange part may be provided by a nut threadably mounted on a section of said loading member. The nut may have a tapered end section which engages within a smoothly profiled internal end surface of the tubular element even before any outward deformation thereof. In other embodiments, the flange part may include at least one rolling element which engages the end surface of the tubular element to cause outward deformation thereof under greatly increased loading conditions.

BRIEF DESCRIPTION OF THE DRAWINGS

Embodiments of the invention will now be described by way of example and with reference to the accompanying drawings, in which:

FIG. 5 is a side view of a loading element of a second embodiment;

FIG. 6 is a sectional view on line A—A in FIG. 5;

FIG. 7 is an end view of the loading element of FIG. 5;

FIG. 8 is a side view of the second embodiment, partly in section, to illustrate a loaded condition of the device;

FIG. 9 is a view similar to FIG. 8 illustrating the device in an unloaded condition;

FIG. 10 is a diagrammatic detail in section of an end portion of another embodiment; and, FIG. 11 is a diagrammatic detail in section of an end of a further embodiment.

DETAILED DESCRIPTION OF THE DRAWINGS

Figure 1:
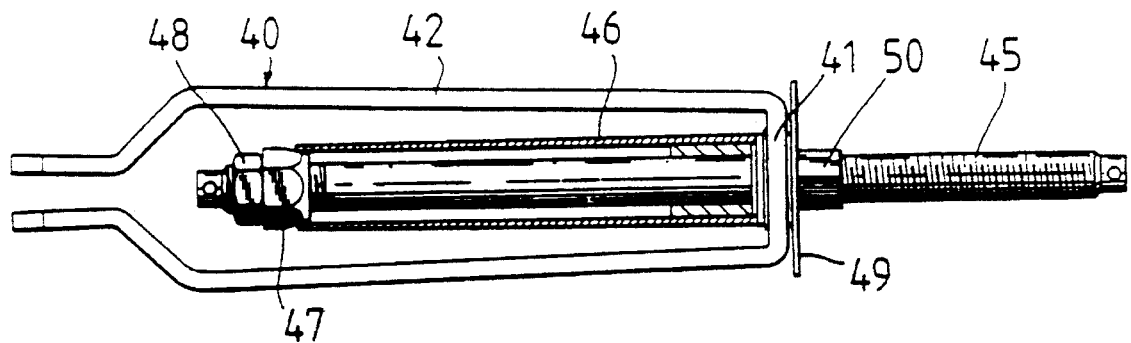
FIG. 1 is a diagrammatic plan view, partly in section, of a shock absorber according to the invention.
Figure 2:
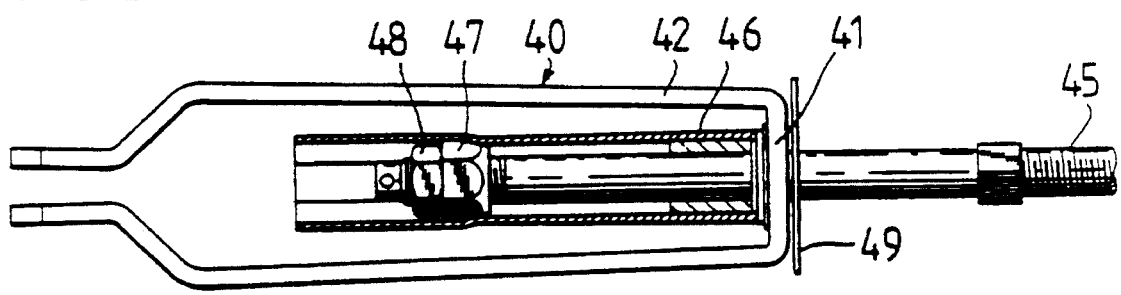
FIG. 2 is a similar view of the shock absorber of FIG. 1 showing it partly expanded under a shock loading.
Figure 3:
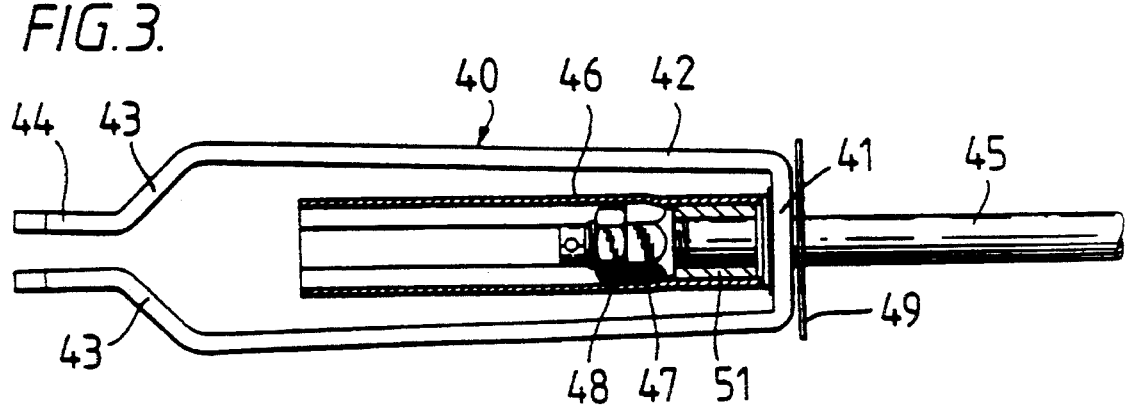
FIG. 3 is a similar view to that of FIGS. 1 and 2 but showing the shock absorber in a fully expanded condition as a result of shock loading.

FIGS. 1–3 illustrate a shock absorbing device which, for example, could be in a safety line system to absorb sudden shock loadings applied to the safety line in use, to reduce the loading applied to fixed anchorage points of the line. The device can also be used in other applications. It is generally similar in form to the shock absorbers described in EP-A-0,212,826 and can be used in the applications described therein.

The shock absorbing device comprises an elongated generally U-shaped frame (40) having a base part (41) and a pair of arms (42) the free ends of which converge at (43) forming a pair of abutting flanges (44) which can be secured either directly to the ends of a safety line in a permanent fixed safety structure, or to the ends of the connecting link of the gripping devices described above for temporary installations. The movable element (45) is in the form of a threaded rod which passes through the base (41) of the frame and extends between the arms (42) thereof. A metal sleeve (46), located between the arms (42), abuts, at one of its ends, the base (41) of the frame. The rod (45) is provided with a retaining nut (47) and secured in position by a lock nut (48). The retaining nut (47) has a tapered nose portion which is dimensioned to engage within the opposed end of the sleeve (46), which has a rounded internal profile to cooperate smoothly with the tapered nose portion of the nut (47). In other possible embodiments, the hexagonal nut (47) could be replaced by other types of threaded members having engagement parts for contacting the sleeve wall, e.g. a collar having radial lobes which could be provided by ball bearings.

A washer (49) is provided on the rod (45) between a nut portion (50) thereof and the base portion (41) of the frame. The purpose of the washer (49) is to indicate when a predetermined required setting tension is achieved in the safety line installation. This correct setting is indicated during installation by the condition of the washer, which is initially gripped between the nut (50) and the frame, becoming freely movable.

FIG. 1 shows the initial condition of the shock absorber under normal loading conditions. However, when a shock load is experienced in the safety wire, this causes the rod (45) to move with the respect of the frame (40) thereby forcing the retaining nut (47) into and along the sleeve member (46). As a result of the dimensioning of these parts, this can only be achieved by a permanent, radially outward deformation of the sleeve as a nut is forced therethrough. FIG. 2 shows an intermediate position of the nut and FIG. 3 shows the fully extended position in which the nut engages a resilient tubular end stop member (51) provided in the sleeve. In this way, the device operates to absorb shock loads experienced in use in the safety line associated with the shock absorber device.

Figure 4A:
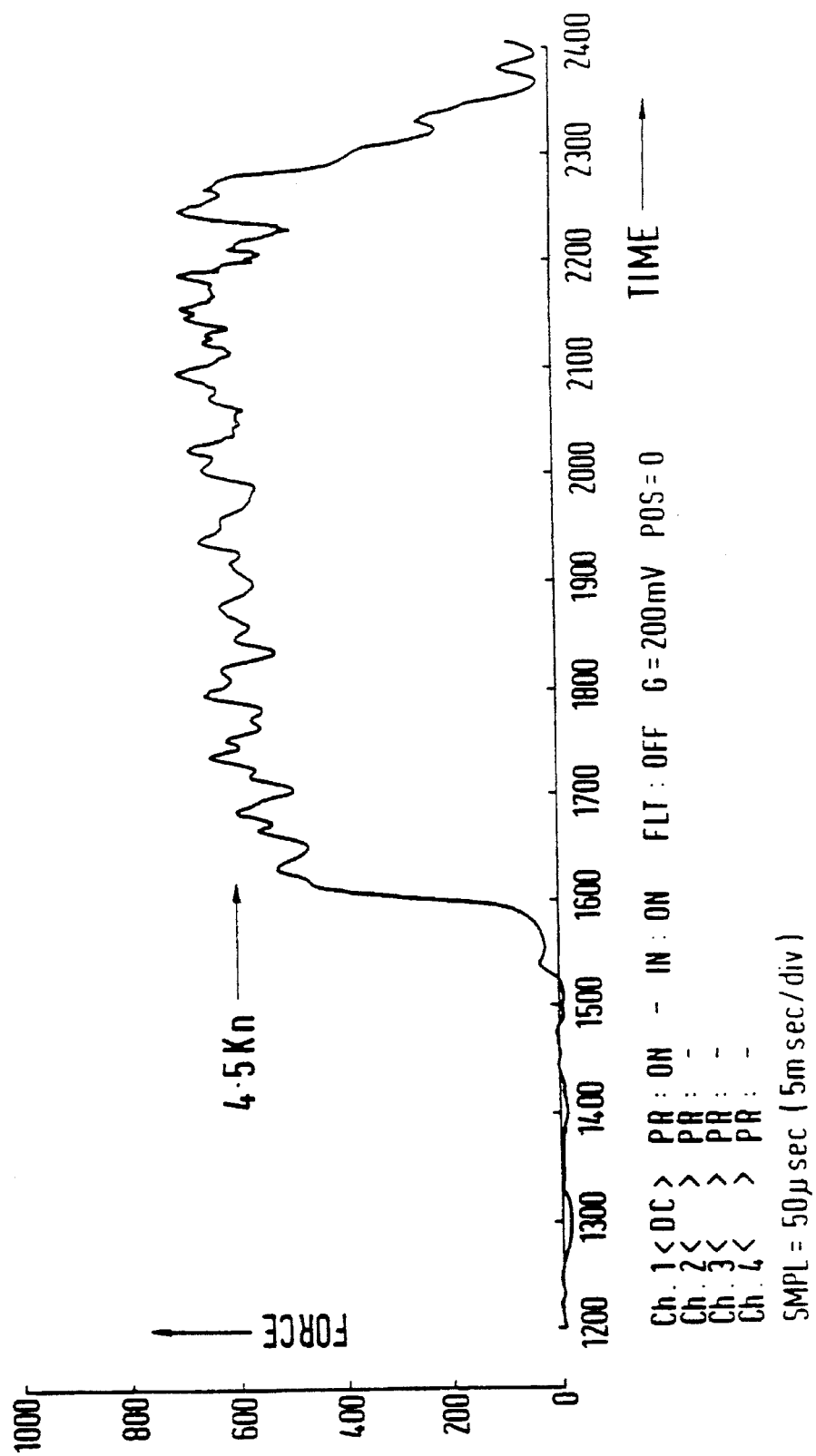
FIGS. 4A and 4B illustrate respective load/extension characteristic of a shock absorber according to the invention under different dynamic loadings.
Figure 4B:
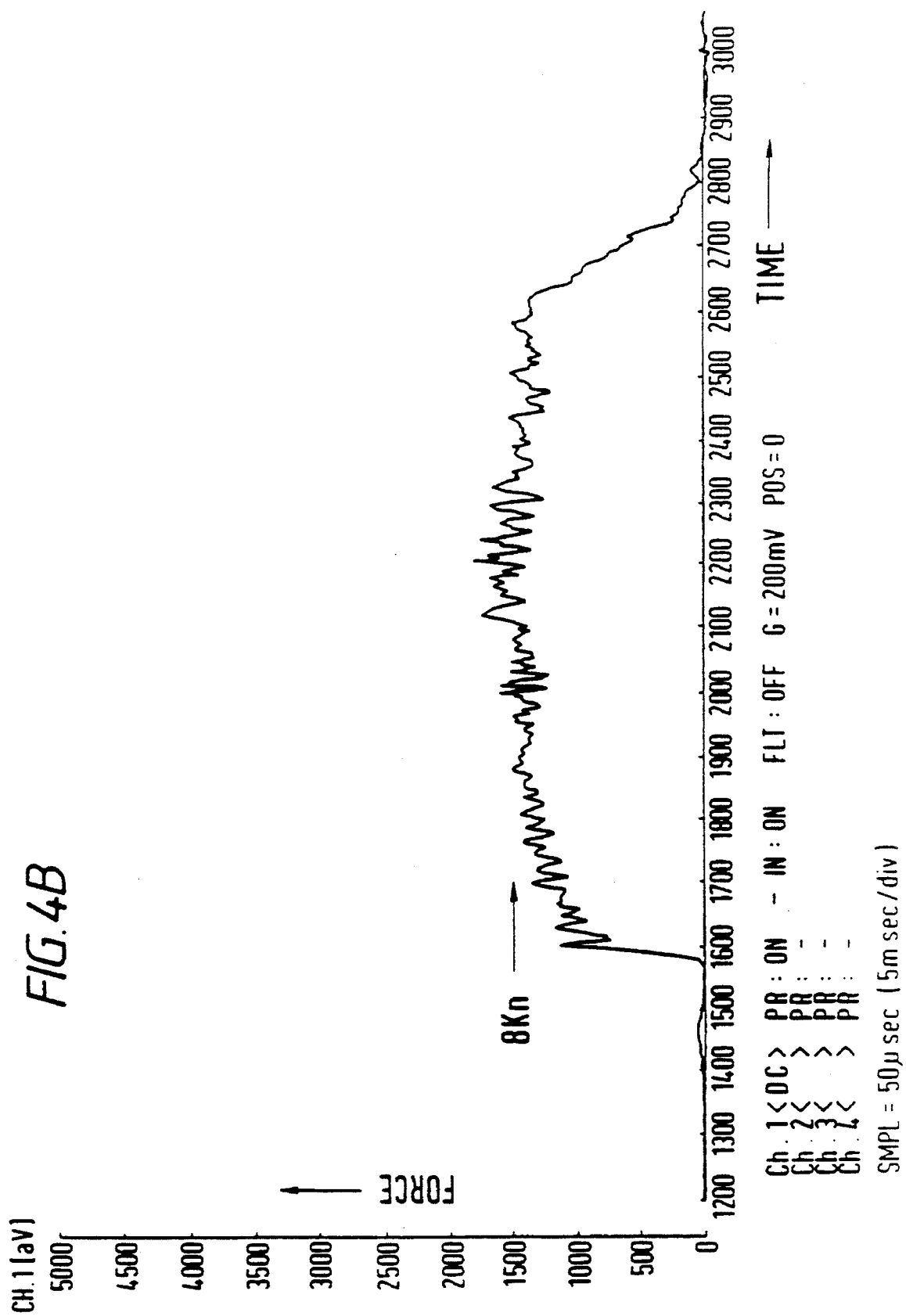

In the embodiment illustrated in FIGS. 1-3, a dry lubricant coating is provided on at least one of the contacting surfaces of the nut (47) and the internal surface of the sleeve (46) to ensure a low frictional contact therebetween. This makes it possible to provide a "flat response profile" load (F)/extension (X) (or load (F)/time (t)) characteristic, as illustrated in FIGS. 4A and 4B showing dynamic test results under different loadings, whereby energy is absorbed by the device at a controlled and predetermined manner. The force can then be controlled predictably by the radial strength of the sleeve and the amount of deformation thereof. Without such a low friction contact, instantaneous excessively high frictional loadings could be applied to the anchorage point of the device which could destroy that anchorage. In this respect, the smooth contacting surfaces between the nut (47) and the sleeve (46) also reduce the possibility of excessively high frictional loadings being produced during a shock absorbing operation.

When the sleeve (46) and the nut (47) are made of a metallic material, at least one of the contacting surfaces thereof, e.g. the internal surface of the sleeve (46) is provided with a surface coating of a dry lubricant, e.g. polytetrafluoroethylene (P.T.F.E.). It would be possible to form the sleeve (46) and/or the nut from a plastics material, which is itself a lubricating material, e.g. P.T.F.E. or is provided with a surface region incorporating such a dry lubricant. Other possible lubricant coatings include molydbenum and graphite.

Possible methods of providing lubricant between the nut (47) and the tube (46) include:

1. Coating of the nut (47) or the tube (46) or both with dry lubrication such as PTFE graphite or molybdenum.

2. Providing the tube (46) or the nut (47) with a sleeve (80) of moulded or extruded lubricating material such as PTFE or material containing lubrication such as graphite filled Nylon, as illustrated in FIG. 11, with an end cap (81) being provided to enclose the end of the assembly.

3. Surface impregnation or either a wet or dry lubricant of the nut (47) or the tube (46) which is manufactured from sintered material suitable for such impregnation.

4. A quantity of oil or grease (82) retained in the nut and tube assembly within an end cap (81) sealed to the tube (46) and an internal sealing member (83) provided within the tube (46) as shown in FIG. 10.

5. Either the nut (47) or the tube (46) is made from a lubricating material such as PTFE or graphite filled Nylon. The material could contain reinforcing agents to add strength such as glass filled PTFE.

FIGS. 5-9 illustrate a second embodiment in which the nut (47), which causes outward deformation of the sleeve (46), in the first embodiment is replaced by a plurality of balls (70). In this embodiment the rod (45') is formed with an annular peripheral recess (71) in a threaded section (72) thereof. An annular cage (73) is threaded onto the rod section (72). The cage (73) has an annular series of windows (74) which are shaped to retain the balls (70) therein, with the balls projecting radially outwardly of the cage (73).

As seen in FIG. 9, the balls initially engage an end surface of the sleeve (46). On excess shock loading, the rod (45') is pulled further into the sleeve (46) whereby a progressive, controlled outward deformation of the sleeve takes place as the balls (70) are forced into the end of the sleeve (46), as illustrated in FIG. 8.

An advantage of a shock absorber according to the invention is that it gives a permanent visual indication that a fall arrest situation has taken place. This would not normally occur with a device incorporating resilient means, e.g. springs, as the energy absorbing means.

We claim:

1. A load attachment system comprising an elongate support element along which a load is movable, said elongate support element having fixing means at its ends for securing the elongate support element to a fixed structure, and a shock absorbing device disposed between said elongate support element and said fixing means, said shock absorbing device comprising two relatively axially movable parts (45,46) connected between said elongate support element and said fixing means, one of said parts being provided by a tubular element (46) having an end surface (75) and the other of said parts being provided by a loading member (45) which extends through the tubular element (46) and is provided with radially-outwardly projecting load applying means (47) which is adapted, under normal loading, to abut or engage against an end of the tubular element (46) and, in response to greatly increased loading, to be pulled into the tubular element (46) to cause a permanent radially outward deformation of the wall of the tubular element (46) said deformation acting to absorb said greatly increased loading, wherein said shock absorbing device is provided with lubricating material to lubricate the contacting surfaces of the loading means (47) and the tubular element (46), whereby the energy of said greatly increased loading is absorbed by the device at a substantially constant rate without excessively high instantaneous frictional loadings.

2. A shock absorbing device according to claim 1 wherein smoothly profiled contacting surfaces are provided on said load applying means (47) and said end surface (75) of the tubular element (46).

3. A shock absorbing device according to claim 2 wherein at least one of said load applying means (47) and said tubular element (46) is metallic and is provided with a surface layer of the lubricating material.

4. A shock absorbing device according to claim 1 wherein at least one of the contacting surfaces on said load applying means (47) and the tubular element (46) is provided by the lubricating material.

5. A shock absorbing device according to claim 1 wherein a reservoir for the lubricating material (80) is provided at an end portion of the tubular element (46) and the contacting surfaces of the load applying means (47) and the tubular element (46) are disposed in the reservoir (80).

6. A shock absorbing device according to claim 1 wherein said load applying means is provided by a nut (47) threadably mounted on a section of the loading member.

7. A shock absorbing device according to claim 6 wherein said nut (47) has a tapered end section which engages within a smoothly profiled internal end surface of the tubular element (46), before any outward deformation thereof.

8. A load attachment system comprising an elongate support element along which a load is movable, said elongate support element having fixing means at its ends for securing the elongate support element to a fixed structure, and a shock absorbing device disposed between said elongate support element and said fixing means, said shock absorbing device comprising two relatively axially movable parts (45',46) connected between said elongate support element and said fixing means, one of said parts being provided by a tubular element (46) having an end surface (75) and the other of said parts being providing by a loading member (45') which extends through the tubular element (46) and is provided with radially-outwardly projecting load applying means (70) which is adapted, under normal loading, to remain located against an abutment on the tubular element (46) and, in response to greatly increased loading, to be pulled into the tubular element (46) to cause a permanent radially outward deformation of the wall of the tubular element (46), said deformation acting to absorb said greatly increased loading, wherein said load applying means includes at least one rolling element (70) which engages said end surface of said tubular element (46) to cause outward deformation of the wall thereof under said conditions of greatly increased loading, whereby the energy of said greatly increased loading is absorbed by the device at a substantially constant rate without excessively high instantaneous frictional loadings.

9. A shock absorbing device according to claim 8 wherein said load applying means comprises an annular series of rolling elements (70) provided on said loading member (45').

10. A shock absorbing device according to claim 1 or claim 8 wherein a resilient end stop (51) for said loading member, is provided within said tubular element (46).

* * * * *

UNITED STATES PATENT AND TRADEMARK OFFICE
CERTIFICATE OF CORRECTION

PATENT NO. : 5,458,221
DATED : October 17, 1995
INVENTOR(S) : Peter R. Flux et al.

It is certified that error appears in the above-indentified patent and that said Letters Patent is hereby corrected as shown below:

Column 3, line 39, delete "molydbenum" and insert --molybdenum--.

Signed and Sealed this

Nineteenth Day of March, 1996

Attest:

BRUCE LEHMAN

Attesting Officer     Commissioner of Patents and Trademarks